United States Patent Office 3,506,839
Patented Apr. 14, 1970

3,506,839
CONTACTLESS PROBE SYSTEM
Shigeru Ando, Ichiro Taniguchi, and Takayuki Miyazawa, Amagasaki, Japan, assignors to Mitsubishi Denki Kabushiki Kaisha, Tokyo, Japan
Filed Feb. 20, 1967, Ser. No. 617,138
Claims priority, application Japan, Feb. 23, 1966, 41/10,976
Int. Cl. G06m 7/00; H01j 39/12; G01d 5/36
U.S. Cl. 250—222   8 Claims

ABSTRACT OF THE DISCLOSURE

A contactless probe system for determining the configuration of an object comprising a laser scanner scanning the surface of the object with a beam of light focused at a point which is a fixed distance from the scanner. A focusing system focuses light reflected back along the axis of the scanning light beam to a selected focal point selected so that if reflected light is constantly at this focal point the focused beam is constantly focused at its focal point directly on the surface of the object. The system determines when light reflected from the object's surface is not at the desired focal length of the fixed focal point and focused at the selected point. Means are provided that respond to the determining of when the reflected light is not at the desired focal length of the fixed point to adjust the distance between the scanner and the surface of the object in order to cause the reflected light to focus at the focal point. The adjustment of this distance relative to a given datum is indicative of the configuration of the surface along an axis on which the adjustment takes place. A servo system moves the scanner in three dimensions represented by three orthogonal axis so that the configuration of the object is determinable in three dimensions.

---

Figure 1:
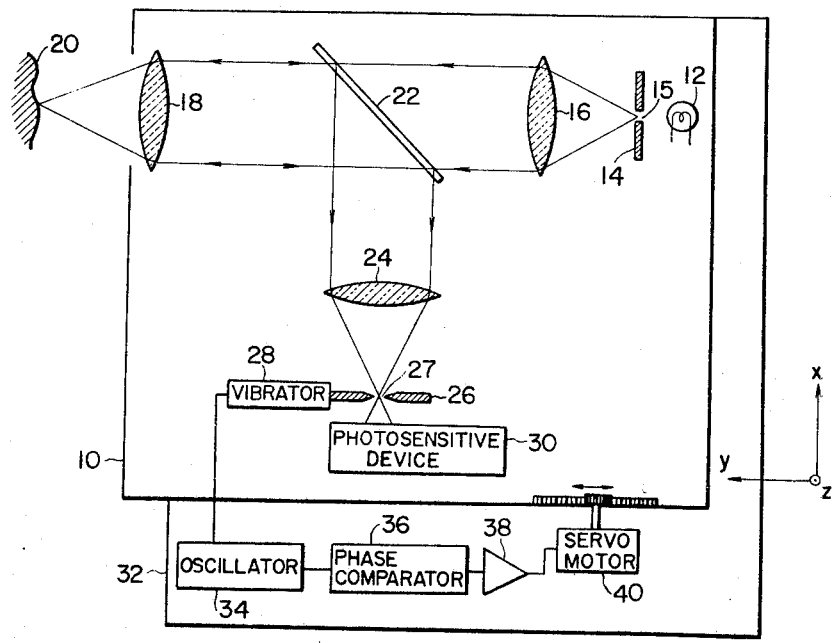

This invention relates generally to probes and more particularly to a contactless probe system for determining a configuration of an object.

If it is desired to represent a configuration of an object according to a three dimensional coordinate system, a very simple method of doing so is to measure a distance between every point on the surface of the object in each of three orthogonal reference planes with a rule. This can be precisely accomplished by a mechanical probe technique well known in the art. Since the mechanical probe technique comprises the use of a probe to contact an object to be determined thereby to determine the configuration of the object. There is a limitation because of the hardness of an object and also it is difficult to effect a continuous measurement. In addition, a measurement utilizing such a technique requires a relatively long time.

A principal object of the invention is, accordingly, to provide a new and improved probe system for determining the configuration of an object without the necessity of using any mechanical probe to be brought into contact with the surface of the object in which the above-mentioned disadvantages are eliminated.

Another object of the invention is to provide a new and improved contactless probe system for determining the configuration of an object through the utilization of optical means.

Still another object of the invention is to provide a new and improved contactless probe system capable of determining a three dimensional configuration of an object in a simple and precise manner.

An additional object of the invention is to provide a new and improved contactless probe system for determining a configuration of an object through the use of a laser device.

These and other objects which will become apparent as the description proceeds are accomplished by the invention providing a contactless probe system determining a configuration of an object. The probe comprises optical means for producing a substantially parallel beam of light. A first lens forms, from the substantially parallel beam of light, a light spot upon a point on the surface of the object and collimates that portion of light reflected from the point. A second lens system focuses the collimated beam of the reflected light from the surface of the object. An electronic oscillator sensor including a vibrating pinhole member vibrated in parallel to the optical axis of the second lens system by the electronic oscillator senses displacement of the position of the beam of light focussed by the second lens system where the focussed beam has a minimum dimension. A phase comparator is responsive to the sensor to provide a signal having a polarity determined in accordance with a direction in which the illuminated point on the surface of the object is displaced from the focal point of the first lens system and a servo responds to the signal from the phase comparator to control the position of the first lens system relative to the object to maintain the distance therebetween substantially constant.

Figure 2:
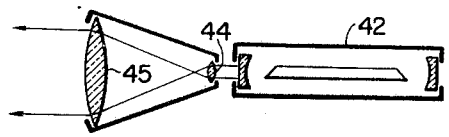

The invention will become more readily apparent from the following detailed description in conjunction with the accompanying drawings in which:

FIG. 1 is a block diagram of a contactless probe system constructed in accordance with the teachings of the invention; and FIG. 2 is a fragmentary diagrammatic view of a modification of a source of light which may be employed in the system illustrated in FIG. 1.

Referring now to FIG. 1 of the drawings, there is illustrated a contactless probe system for determining a configuration of an object according to the teachings of the invention. An arrangement illustrated includes a movable table 10 adapted to be movable in a predetermined direction, in this case, in the horizontal direction as view in FIG. 1 in a manner which will be described hereinafter. Disposed on the table 10 are a source of light, shown as an electric lamp 12 (which may be preferably monochromatic), an entrance aperture plate 14 having an entrance pinhole 15 located in front of the source 12, a convex lens 16 positioned so as to produce a substantially parallel beam of light from a light emitted by the source 12 and passing through the pinhole 15, and another convex lens 18 having a focal length of $f_1$ and aligned with the lens 16. The convex lens 18 is opposed to an object 20 whose configuration is to be determined and which is supported by any suitable separate support means (not shown) and serves to focus the parallel beam of light at a distance of $f_1$ therefrom. If any point on the surface of the object 20 lying on the common optical axis of the lenses 16 and 18 is at a distance of $f_1$ from the lens 18 the parallel beam of light will be precisely focussed on that point by the lens 18. Disposed between the convex lenses 16 and 18 is a half silvered reflector plate 22 at an angle of 45 degrees to the optical axis of both lenses for a purpose which will be made apparent hereinafter.

Assuming that the object 20 does not absorb a great portion of the light falling onto the same and is not a perfect mirror, the portion of the light incident upon the surface of the object is reflected in all directions. If that point on the object's surface upon which the light falls is spaced away from the lens 18 by a distance of $f_1$, or if the light is precisely focussed at that point then that portion of the light reflected by the object is formed into a substantially parallel beam of light by the lens 18 and this beam strikes against the half-silvered reflector plate 22 which, in turn, reflects the substantially parallel beam of light in a direction perpendicular to the optical axis of both lenses 16 and 18 and downwardly as viewed in FIG. 1. In order to focus the substantially parallel beam of light reflected by the reflecting plate 22 a convex lens 24 having a focal length of $f_2$ is provided on the table 10.

As shown in FIG. 1, a vibratory exit aperture plate 26 provided with an exit pinhole 27 is disposed on the table 10 in such a position that the exit pinhole 27 is always put on the optical axis of the lens 24. A vibrator 28 on the table 10 is operatively connected to the aperture plate 26 to vibrate it with a low amplitude and a predetermined frequency in a manner such that the pinhole 27 vibrates parallel to the optical axis of the focussing lens 24 while it is maintained on the optical axis thereof. Preferably, the exit pinhole 27 has a diameter equal to or less than a minimum dimension of the beam of light focussed by the lens 24. Further the aperture plate 26 is normally positioned such that, the focal point of the lens 24 is at the center of vibration of the pinhole 27. Thus it will be appreciated that if an illuminated point on the object's surface is slightly displaced from the focal point of the lens 18 in one or the other direction that the corresponding light spot focussed by the lens 24 will be moved along the optical axis of the lens 24 toward or away from the center of vibration of the pinhole 27 as the case may be.

Disposed on the table 10 is a photosensitive device 30 such as a photocell for receiving the portion of light passed through the exit pinhole 27 on the apertured plate 26.

As shown in FIG. 1, another movable table 32 is disposed adjacent the table 10. Since the table 10 is movable along the $y$ axis of the three dimensional coordinate system shown in FIG. 1, the table 32 is arranged to be movable along either or both of the remaining $x$ and $z$ axes of the coordinate system together with the table 10 manually or by any suitable driving means (not shown).

Disposed on the second table 32 are disposed an electronic oscillator 34 for generating a suitable sinusoidal electric wave driving the vibrator 28 and hence the aperture plate 26, and a phase comparator 36 having a pair of inputs supplied from the photosensitive device 30 and the oscillator 34, respectively. The phase comparator 36 compares the output from the photosensitive device 30 with the output from the oscillator 34 to produce a DC output voltage whose polarity may be positive or negative in accordance with a displacement of the illuminated point on the object's surface from the focal point of the lens 18 in one or the other direction along the $y$ axis.

More specifically, when an illuminated point on the surface of the object 20 is at a distance from the lens 18 substantially equal to the focal length $f_1$ thereof, the corresponding beam of light passing through the lens 24 has a minimum diameter at the center of vibration about which the pinhole 27 is vibrating. This causes the output from the photocell 30 to have no component of the fundamental frequency at which the pinhole 27 is vibrating whereby the phase comparator 34 provides a null output.

On the other hand, if the illuminated point on the surface of the object 20 is slightly displaced from the focal point of the lens 18 in one or the other direction along the $y$ axis then the beam of light focussed by the lens 24 has a minimum diameter at a point correspondingly displaced from the center of vibration in one or the other direction along the $x$ axis and on the optical axis of the lens 24. At the same time the component of the fundamental frequency appears in the output from the photocell 30 and the photocell output will have a phase different from that of the output from the electronic oscillator 34 by an angle of 0 or $\pi$ in accordance with the direction in which the illuminated point on the object's surface has been displaced from the focal point of the lens 18 whereupon the phase comparator 36 provides a positive or negative signal at its output.

The signal from the phase comparator 36 is applied to a servo amplifier 38 where it is amplified. The amplified signal drives a servo-motor 40 in a direction determined by its polarity, whereby the table 10 is moved in the corresponding direction until the illuminated point on the object's surface coincides with the focal point of the lens 18. At that time, the beam of light focussed by the lens 24 will have the minimum diameter at the center of vibration of the pinhole 27. Simultaneously the component of the fundamental frequency disappears from the output of the photosensitive device 30 and the phase comparator 36 provides the null output, stopping the servo-motor 40 and hence the table 10. Thus the table 10 is maintained in a position where the illuminated point on the surface of the object 20 is at the focal point of the lens 18. It will be apparent that this position of the table 10 relative to a certain reference plane, for example, the lens 18 can be easily measured by any sutiable measurement means, not shown such as scale and pointer means.

The table 32 along with the table 10 can be moved along either of the $x$ and $z$ axes by incremental distances (which can be also measured) and then the process as above described is repeated until all the entire surface of the object 20 is scanned by the light spot focussed by the lens 18. In this way, the configuration of the object 20 has been determined in three dimensions.

Referring now to FIG. 2, there is illustrated a modification of the optical system for producing a substantially parallel beam of light. The optical system illustrated may substitute the combination of the source 12, the aperture plate 14 and lens 16 shown in FIG. 1 and comprises a gas laser device of continuous oscillation type 42 well known in the art and a pair of convex lenses 44 and 45 disposed so as to produce a substantially parallel beam of light. The pair of lenses 44 and 45 may be said to form an inverse telescope. A substantially parallel beam of light emitted by the laser device 42 is focussed by the lens 44 near to the latter. The focussed beam of light is again shaped into a substantially parallel beam of light by the other lens 45 and directed toward the lens 18 shown in FIG. 1.

With the arrangement illustrated in FIG. 2 chromatic aberration of the lenses used with the invention is avoided because the light emitted by the laser device 42 has an excellent monochromatic property as compared with the arrangement shown in FIG. 1. Also the beam of light emitted by the laser device 42 has a good degree of parallelism, as well known in the art and such a beam of light is additionally shaped into a substantially parallel beam of light by the inverse telescope 44–45 resulting in an improvement in the degree of parallelism. This allows the lenses 18 and 24 to focus the associated beam of light into a narrow spot resulting in improvement in accuracy of measurement. Further, due to the great brightness of the light emitted by the gas laser, the photosensitive device 30 can provide its output improved in ratio of signal to noise resulting also in improvement in accuracy of measurement.

The invention has several advantages. For example, a continuous measurement can be effected in a contactless manner. The time of measurement can be substantially reduced as compared with the prior art practice. In addition, the present method is not substantially restricted as to the hardness, configuration and dimension of an object to be determined unless it absorbs a great part of a quantity of light falling thereon.

While the invention has been illustrated and described with reference to a few preferred embodiments thereof it is to be understood that numerous changes and modifications may be resorted to without departing from the spirit and scope of the invention.

What we claim is:

1. A contactless probe system for determining in three dimensions the configuration of an object comprising, scanning means scanning the surface of an object with a beam of light focused at a point which is a fixed distance from the scanning means, means focusing light reflected back along the axis of the scanning light beam to a selected focal point selected so that if reflected light is constantly at said selected focal point the focused beam is constantly focused at its focal point directly on said surface, means determining when light reflected from said surface is not at the desired focal length of said fixed focal point and focused at said selected point, means responsive to the last-mentioned means adjusting the distance between said scanning means and said surface of said object to cause the reflected light from said surface to focus at said focal point, whereby the adjustment of said distance relative to a given datum is indicative of the configuration of said surface along an axis on which adjustment of said axis takes place, and means for moving the scanning means in three dimensions represented by three orthogonal axes.

2. A contactless probe system for determining in three dimensions the configuration of an object, in which said scanning means comprises means scanning the surface of said object with coherent light.

3. A contactless proble system for determining in three dimensions the configuration of an object according to claim 2, in which said means scanning with coherent light comprises a laser.

4. A contactless probe system according to claim 1, in which said scanning means comprises, a source of light, a lens system focusing a beam of light on said surface, said means focusing reflected light comprising a mirror and a lens focusing the reflected light.

5. A contactless probe system according to claim 4, in which said means determining when reflected light is not focused at said focal point comprises a mask having an aperture at said focal point, means to generate signals applied to said means adjusting the distance between the scanning means and said surface for adjusting the distance to cause said reflected light to focus at said focal point.

6. A contactless probe system according to claim 5, in which said lens system comprises lens for establishing a focal length of said focused beam proportional to the focused length of said mirror and lens focusing reflected light at said selected focal point.

7. A contactless probe system according to claim 5, in which said means to generate signals comprises means generating reference signals, means responsive to reflected light passing through said aperture generating other signals, comparator means comparing said reference signals and other signals and evolving the first-mentioned signals applied to said means adjusting the distance between said scanning means and said surface of said object.

8. A contactless probe system according to claim 7, in which said mask is parallel to the first-mentioned beam of light, and in which said means generating said reference signal comprises a vibrator oscillating said mask at a constant frequency and applying a signal corresponding to said frequency to said compartor as said reference signal.

References Cited

UNITED STATES PATENTS

| | | | |
|---|---|---|---|
| 2,385,503 | 9/1945 | Glasser | 88—140 |
| 2,897,722 | 8/1959 | Gunter et al. | 88—140 |
| 2,933,668 | 4/1960 | Brouwer | 250—202 X |
| 3,016,464 | 1/1962 | Bailey. | |
| 3,293,438 | 12/1966 | Davis | 250—217 X |
| 3,323,417 | 6/1967 | Grey et al. | 88—56 |

OTHER REFERENCES

What's New, December 1965.

RALPH G. NILSON, Primary Examiner

C. LEEDON, Assistant Examiner

U.S. Cl. X.R.

250—232; 356—4